Jan. 29, 1963 R. L. SCHULTZ 3,075,626

RECORD TAPE FEED MECHANISM FOR BUSINESS MACHINES

Filed Feb. 4, 1960 7 Sheets-Sheet 1

*INVENTOR.*

RALPH L. SCHULTZ

*BY*

Wupper, Gradolph & Love

ATTORNEYS

INVENTOR.
RALPH L. SCHULTZ
BY
Wupper, Gudolph & Love
ATTORNEYS

RECORD TAPE FEED MECHANISM FOR BUSINESS MACHINES

Filed Feb. 4, 1960

INVENTOR.
RALPH L. SCHULTZ
BY
Wupper, Gradolph & Love
ATTORNEYS

Jan. 29, 1963 R. L. SCHULTZ 3,075,626

RECORD TAPE FEED MECHANISM FOR BUSINESS MACHINES

Filed Feb. 4, 1960

7 Sheets-Sheet 4

INVENTOR.
RALPH L. SCHULTZ

BY

Wupper, Gradolph & Love

ATTORNEYS

Jan. 29, 1963

R. L. SCHULTZ 3,075,626

RECORD TAPE FEED MECHANISM FOR BUSINESS MACHINES

Filed Feb. 4, 1960

7 Sheets-Sheet 5

*INVENTOR.*

RALPH L. SCHULTZ

*BY*

Wupper, Gradolph & Love

ATTORNEYS

INVENTOR.
RALPH L. SCHULTZ
BY
Wupper, Gradolph & Love
ATTORNEYS

Jan. 29, 1963 R. L. SCHULTZ 3,075,626

RECORD TAPE FEED MECHANISM FOR BUSINESS MACHINES

Filed Feb. 4, 1960 7 Sheets-Sheet 7

*INVENTOR.*
RALPH L. SCHULTZ
*BY*
Wupper, Gradolph & Love
ATTORNEYS

United States Patent Office 3,075,626
Patented Jan. 29, 1963

3,075,626

RECORD TAPE FEED MECHANISM FOR BUSINESS MACHINES

Ralph L. Schultz, Chicago, Ill., assignor to Victor Adding Machine Co., Chicago, Ill., a corporation of Illinois
Filed Feb. 4, 1960, Ser. No. 6,788
9 Claims. (Cl. 197—114)

The invention relates generally to business machines such as adding, calculating, and bookkeeping machines, and more particularly to a novel means for feeding the record tape or sheet a different number of spaces, depending upon the particular operation of the machine being performed.

It is an object of the invention to provide an improved record sheet or tape feed mechanism, particularly for adding and calculating machines, by which the record tape or sheet may be fed different distances depending upon the character of the operation of the machine, i.e., whether it is simple adding or subtraction, totaling, or subtotaling.

It is a further object to provide a record tape feeding mechanism for adding machines of the "blind" printing type in which the tape is retracted and then advanced so that the amounts printed on the tape are clearly visible after each operation of the machine, and so that severance of a part of the tape by pulling it against the tear strip will take place at a position which will not interfere with the legibility of the results of a just completed problem, nor with the legibility of the printing of the problem next to be performed.

A further object is to provide an improved record tape feeding mechanism for adding machines and the like, in which there is a substantially greater line spacing of the tape following a total imprint than the spacing of added, subtracted amounts, or subtotals, so as to avoid the possibility that the first amount entered in the machine following a total-taking operation shall not be severed or partially severed (and thus not available for checking purposes), but that for all other types of operating cycles normal line spacing will occur.

Other objects will become apparent from the following description, reference being had to the accompanying drawings, in which FIG. 1 is a right-hand side elevation of the record tape feeding mechanism and associated parts in normal position;

Generally speaking, the invention disclosed herein is an improvement upon that shown in the patent to E. M. Lippert No. 2,318,000. Stated briefly, the invention herein disclosed is for the purpose of feeding the paper tape upwardly and downwardly in the manner diagrammatically represented in FIG. 13, to produce a printed tape of the type represented in FIG. 14.

In the following description, and in the claims, the word "push' is used to mean that the record tape is retracted, that is, moved downwardly, while the word "pull" is used to describe the operation and means whereby the record tape is advanced or moved upwardly and outwardly of the machine.

Figures 13, 14:
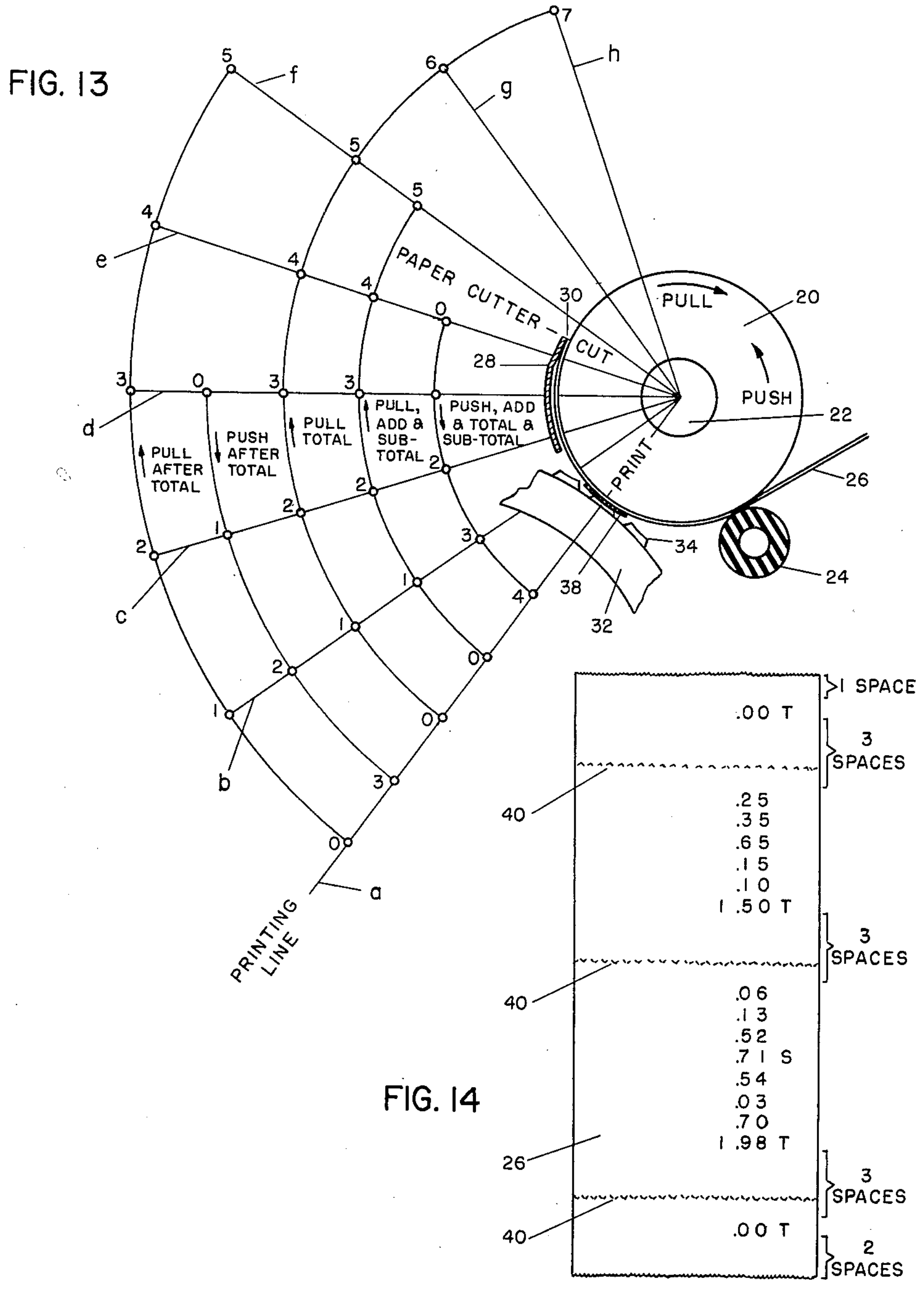
FIG. 13 is a diagram showing the pusher and puller pawls' functions during various cycles of operation of the machine.
FIG. 14 shows a representative record tape as made by the printing and paper feeding mechanism of the machine.

In FIG. 13, the platen 20, mounted on the shaft 22, has a paper feed roller 24 which resiliently engages the record tape 26 and holds it against the platen. There is provided a paper cutter tear strip or bar 28 having a serrated upper edge 30. The type carrier segment 32, bearing type 34, is adapted in the customary manner to press an inked ribbon 38 (FIG. 13) against the taper tape when the platen is swung toward the type. These parts are illustrated in the position assumed in making printing impression.

In an operation of addition, subtraction, and in taking a subtotal, the platen 20, after printing has taken place, will rotate clockwise in the pull direction from the printing line *a* five spaces to the radial line *f* so as to expose the amount entered in the machine. Upon the following adding cycle of the machine, the platen will be rotated counterclockwise in the push direction a distance of four spaces so that when the printing of said following amount occurs the previously printed amount will be in position corresponding to radial line *b*, and the printing will take place one space below this previously printed amount, namely, at the printing line *a*, and following the printing, the tape will be rotated five spaces in the pull direction so that the second printed amount will be visible above the upper edge of the tear strip, at line *f*.

In a total-taking cycle, the platen will be rotated in the push direction so as to bring the tape in a position to print the total immediately below the last item (or subtracted), and, after printing, the platen will be rotated clockwise in the pull direction a distance of seven spaces from the printing position so that the total will appear in a position of the radial line *h* which is approximately in the third space above the cutting edge of the cutter bar.

This functioning of the paper feed mechanism is also illustrated by the sample paper tape 26 shown in FIG. 14. It will be noted that the upper end of the tape was severed so as to leave one space before a "check" clearing total was taken, indicated by the printed symbols ".00T." Thereafter, upon entering the first amount to be added, shown as ".25," the paper was fed downwardly three spaces, that is, the total printed shown in the *h* position will be pushed counterclockwise to the *e* position, leaving three blank spaces corresponding to the positions *d*, *c*, and *b*, and will print in the fourth line, that is, line *a*, leaving three blank spaces shown on the tape in FIG. 14.

After the taking of a total, as indicated by the tape shown in FIG. 14, and the tape is severed by tearing it against the cutter bar (indicated by dotted lines 40), there will be two blank spaces following the total designation, as shown at the lower end of the tape, and there will be a blank space above the next amount entered in the machine. This is illustrated in FIG. 14 by the phantom lines 40 and by the serrated upper and lower ends of the tape.

Figures 1, 2:
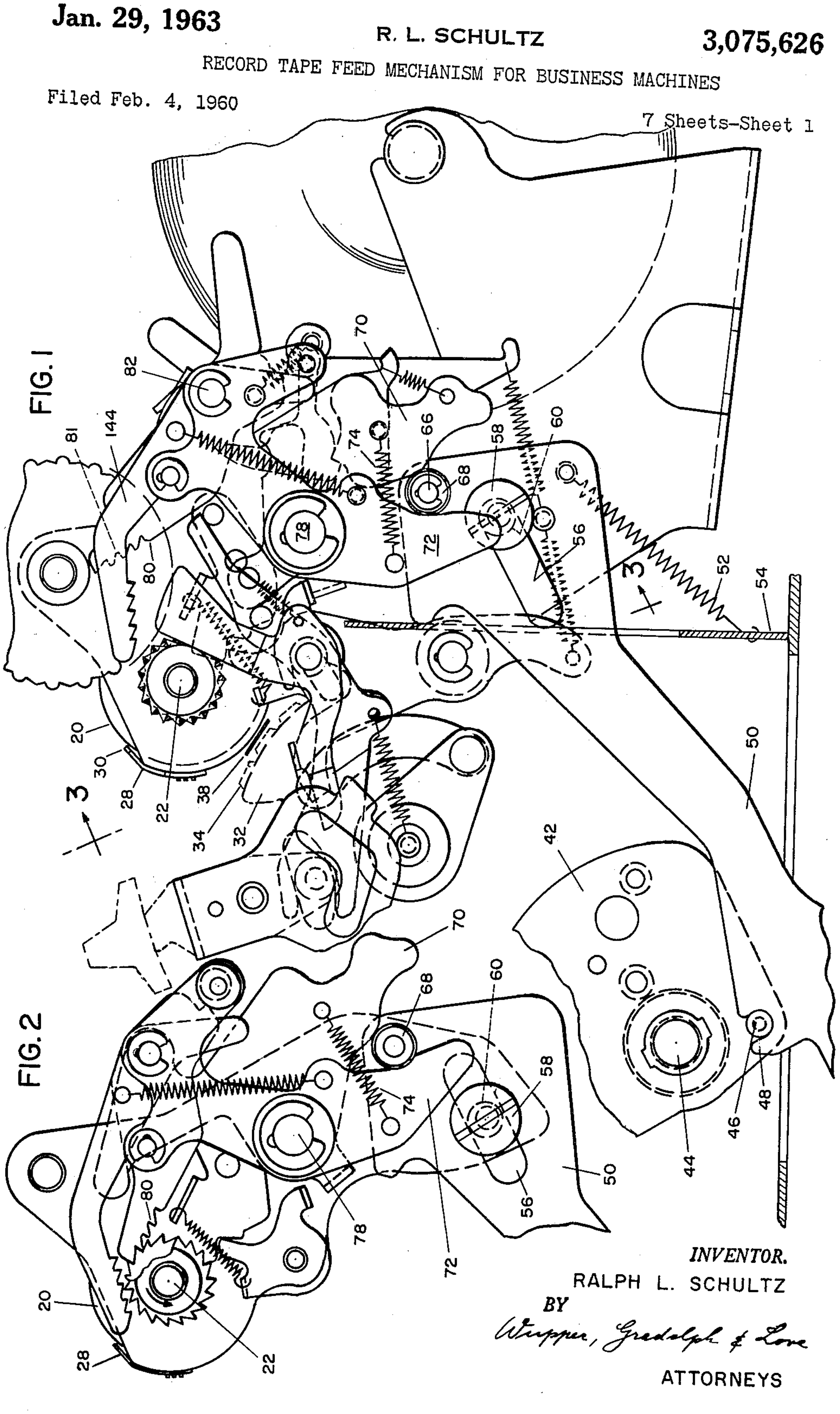
FIG. 2 is a right side elevational view showing the paper feed pawl in partially advanced position and showing the pusher pawl in engagement with the ratchet wheel secured to the platen.
Figures 3, 4:
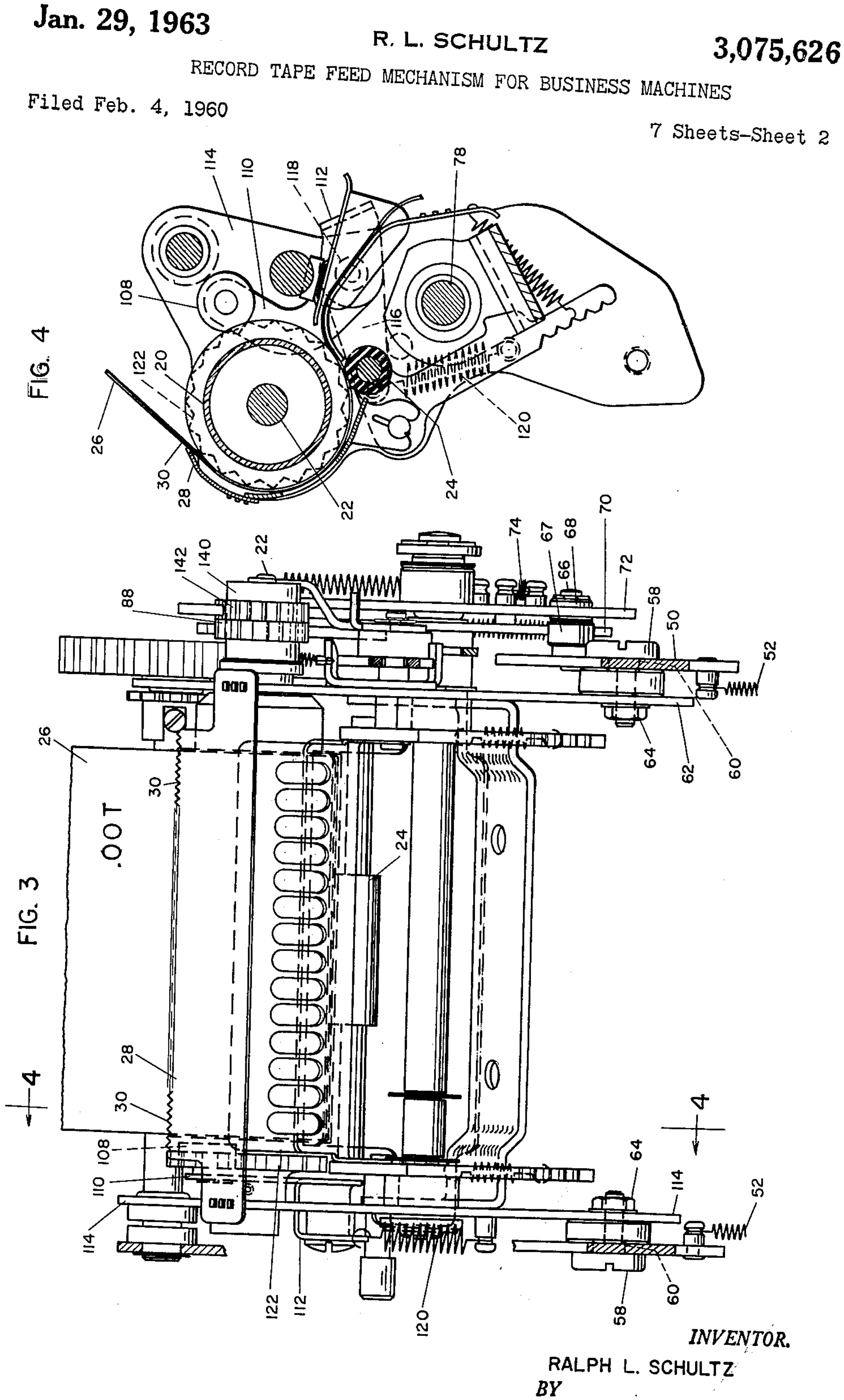
FIG. 3 is substantially a front elevational view of the paper carriage, taken on the line 3—3 of FIG. 1.
FIG. 4 is a cross sectional view of the paper carriage, taken on the line 4—4 of FIG. 3, showing the detent pawl and ratchet.

Referring to FIG. 1, which shows the mechanism for pushing and pulling the record tape, it will be noted that a plate 42 secured to the main shaft 44 has a pin 46 secured thereto, this pin being normally engaged in a notch 48 formed in a drive link 50. (In certain machines it may be desirable to disengage the link 50 from the pin 46 in nonprint and nonpaper feed cycles.) The link 50 is held in the position shown in FIG. 1, with the notch 48 engaging the pin 46, by a tension coil spring 52 anchored to the frame plate 54 of the machine. The rearward part of the link is provided with an elongated slot 56 through which a stud 58 projects. This stud is provided with an eccentric portion 60 (see FIG. 12) and is threaded in the carriage main side frame plate 62, being locked in adjusted position by a nut 64 (FIG. 3). By rotation of this stud the length of the travel of the link 50 may be varied for the purpose of adjusting the force applied by the platen to the type segments during the printing operation. This platen swinging mechanism is duplicated at the left side of the machine to assure uniformity of pressure of the platen along the line of type.

The link 50 has a sidewardly extending stud 66 carrying a pair of rollers 67 and 68 (FIG. 3) respectively engaging pusher pawl crank 70 and puller pawl crank 72 (FIG. 1). These cranks are normally held in engagement with these rollers by a tension spring 74. In a normal cycle the plate 42 rocks counterclockwise during approximately half the cycle, whereupon the printing takes place, and thereafter is returned clockwise to the normal position shown in FIG. 1.

Figures 5, 12:
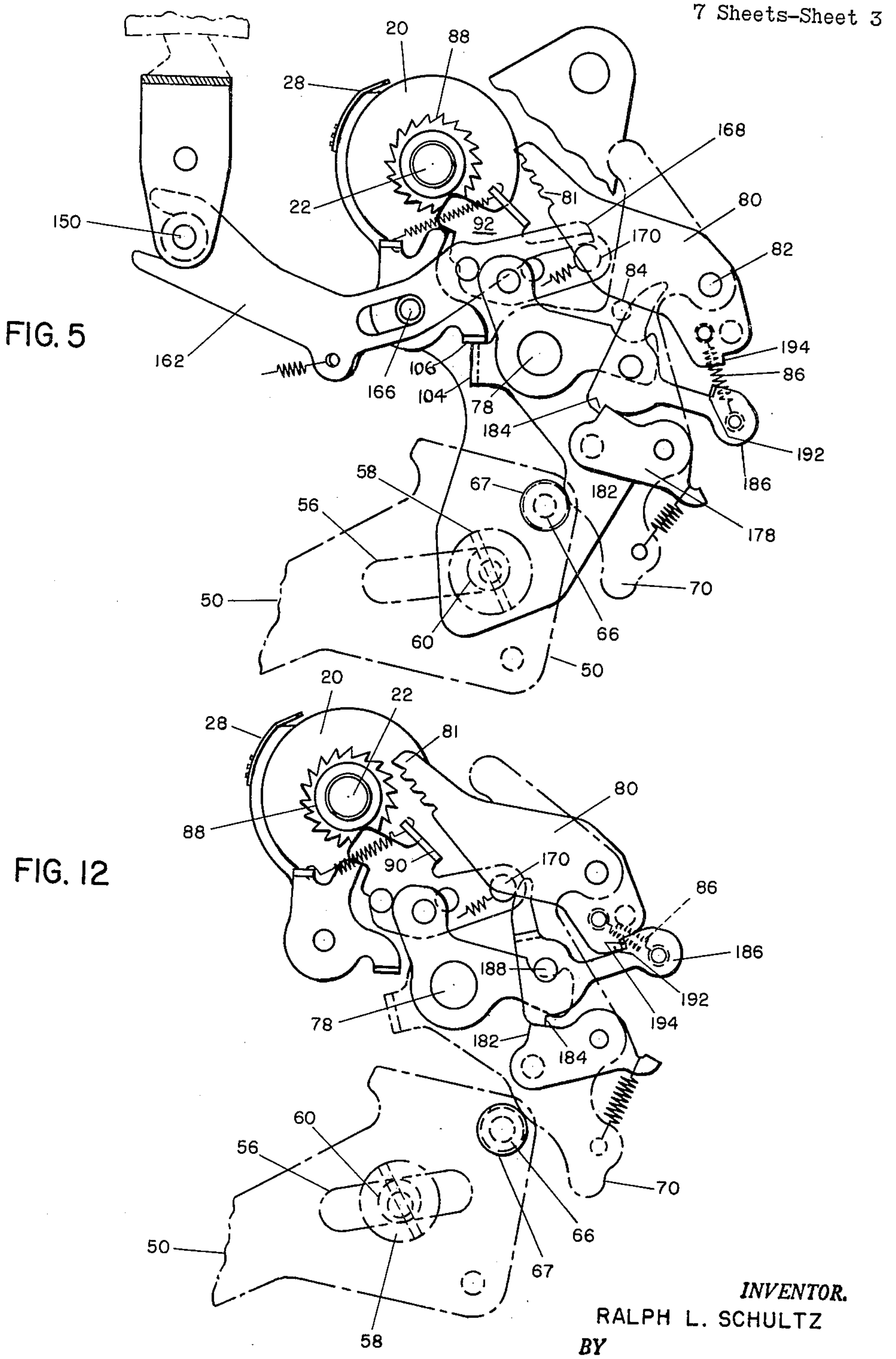
FIG. 5 is a view similar to FIG. 1, showing the pusher pawl in normal position.
FIG. 12 is a view similar to FIG. 1, showing the parts in the position assumed at the beginning of a forward stroke after a total-taking operation, with the pusher pawl in position to feed back the tape three spaces.

Upon the rearward motion of the link 50 the roller 67 engages a pusher feed pawl crank 70, swinging the latter counterclockwise about its pivot shaft 78. As shown in FIG. 5, a feed pawl 80 is pivoted to the push crank 70 by a stud 82. The pawl 80 is normally held against a stop stud 84 by a spring 86. The pawl 80 has four teeth 81 thereon for engagement with the teeth of a ratchet wheel 88 secured to the platen shaft 22.

Figures 6, 7:
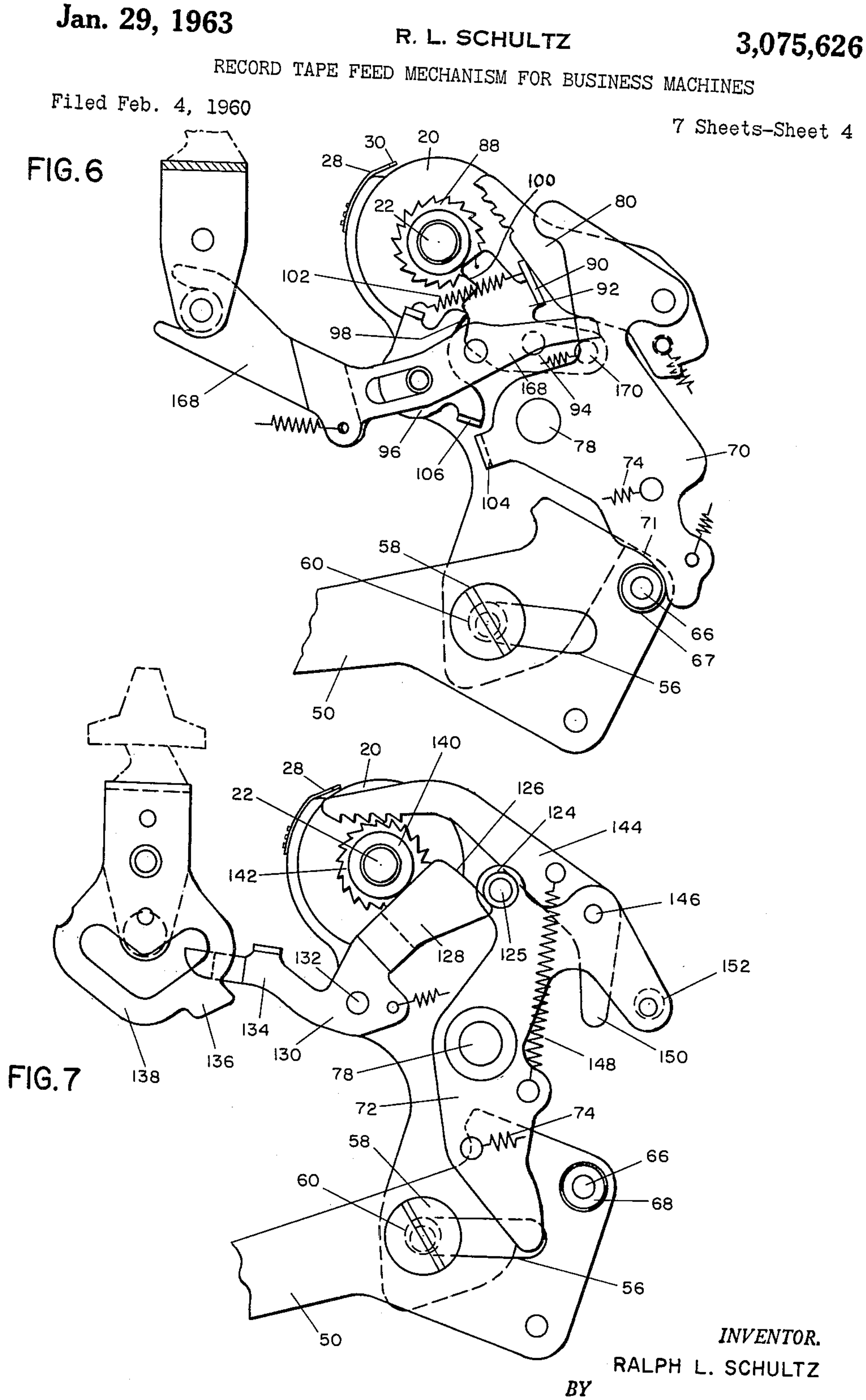
FIG. 6 is a view similar to FIG. 5, showing the carriage in printing position and the pusher pawl disengaged from its ratchet.
FIG. 7 is a view similar to FIG. 1, showing the pull pawl about to go into engagement with its ratchet wheel, and the carriage moving toward printing position.
Figures 8, 9:
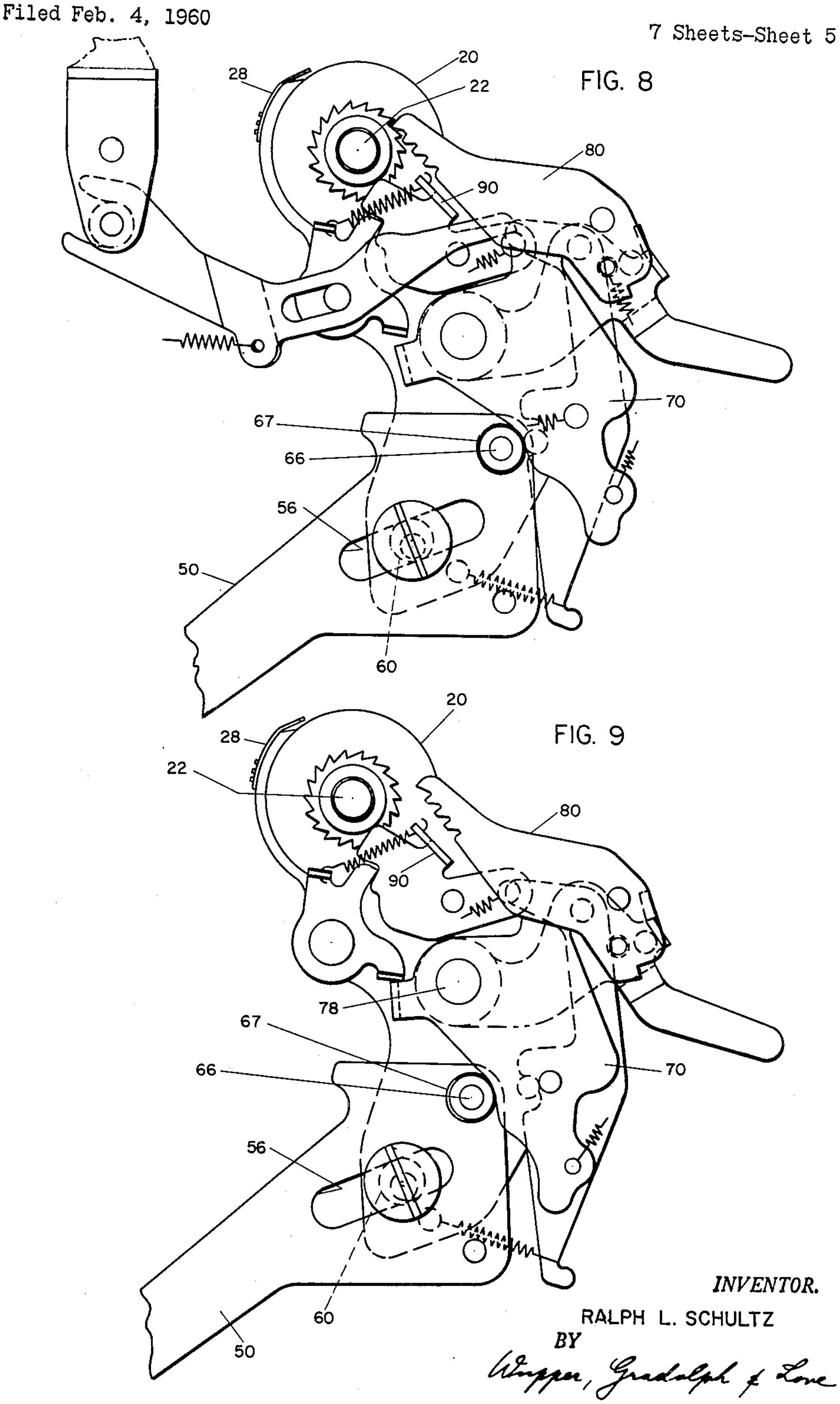
FIG. 8 is a view similar to FIG. 1, with the pusher pawl in position to start feeding the tape.
FIG. 9 is a view similar to FIG. 1, with the parts set for double spacing and the pusher pawl adapted to retract the tape three spaces.

In a normal adding cycle, the link 50 is moved rearwardly and the roller 67 engages the pawl crank 70, swinging the latter counterclockwise about its pivot 78, and in moving forwardly the pawl 80 engages ratchet wheel 88 and rotates the platen through an angle corresponding to four spaces on the tape. Upon continued movement of the link 50 rearwardly, when the forward end of the slot 56 engages the stud 58, the printing carriage assembly pivoting on shaft 78 (FIG. 1) swings counterclockwise to cause the printing impression at the position represented by the radial line *a* in FIG. 13. As the tape is moved to the position for printing, the pawl 80 is disengaged from the ratchet wheel 88 by a sidewardly extending lug 90 formed on a crank 92 pivoted on a stud 94 (FIG. 6). During the forward printing stroke the crank 92 is latched in the position shown in FIG. 6 by a bell crank latch member 96 which has a toothed portion 98 engageable in a notch 100 formed in the crank 92, these parts being held in engagement by a coil spring 102 tensioned to swing the latch member clockwise.

During the return stroke, after printing has taken place, the link 50 will be moved forwardly upon the return or clockwise movement of the main rock shaft 44 (FIG. 1), and the push pawl crank 70 (FIG. 6) will swing clockwise about its pivot 78, thereby causing the engagement of the lug 104 with the lug 106 to swing the latch lever 96 counterclockwise and release the crank 92 for counterclockwise swinging movement under the influence of its spring 102.

Incidentally, it will be noted, particularly from the showing in FIG. 6, that the crank 70 has a cam-like conformation at 71 which provides a dwell portion for the pawl 80, permitting the printing section to swing against the platen without further actuating the pawl 80, thus preventing smudging of the impressed figures on the tape, which might otherwise occur if the rotation of the platen were continued during the actual printing impression portion of the cycle, and increasing the tolerance of the exact time that the platen is brought into printing impression position with respect to the type.

The platen 20 is held in proper indexed position by a roller 108 (FIG. 4) rotatably mounted on the upwardly extending arm 110 of a bell crank 112. The arm 110 is to the right of the printing carriage frame plate 114, while the horizontally extending arm 116 is to the left of the frame plate 114, this bell crank being biased for counterclockwise movement about a stud 118 by a tension spring 120 (FIGS. 3 and 4) to maintain the detent roller 108 in contact with a detent ratchet 122 so as accurately to position the platen and paper tape in the position it has been moved by the pawl 80 or the puller pawl, as will appear hereinafter. It is necessary that the platen be held in properly indexed position for engagement of the ratchet wheels 88, 142 by the push and pull pawls 80 and 144.

While the link 50 is being moved rearwardly, the pull pawl crank 72 will tend to swing counterclockwise to maintain its lower end portion in engagement with the roller 68 on the stud 66 (FIG. 7). However, the counterclockwise movement of the pull pawl crank 72 is limited by engagement of a roller 124 on stud 125 with the upper and rearward end 126 of an offset arm 128 of a bell crank 130 pivoted on a stud 132. The other arm 134 of the bell crank 130 is engageable by a projection 136 of a pivoted total key lever 138 for purposes which will subsequently be described.

The bell crank 130 (FIG. 7) is urged to have its upper arm 128 in engagement with the hub 140 of the pull ratchet wheel 142 secured to the platen shaft 22 adjacent the ratchet wheel 88. During the return stroke of a normal adding cycle, the link 50 is moved forwardly to cause engagement of roller 68 with the lower end portion of the pull pawl crank 72, swinging this crank clockwise about its pivot shaft 78 and thereby moving rearwardly a pull pawl 144 which is pivoted to the crank 72 by a stud 146. The pawl 144 is normally biased by a spring 148 to bring its teeth into engagement with the ratchet wheel 142. The spring 148 also biases the pawl 144 to swing counterclockwise so that the lower tail portion 150 of this pawl is brought into engagement with an adjustable eccentric stud 152.

The mechanism, and the operation thereof which occurs during a normal adding, subtracting, and subtotal cycle of the machine, has been described. It will now be pointed out how the mechanism operates during a total-taking cycle.

However, when the total key 154 is swung counterclockwise to initiate a total-taking cycle (FIG. 10), lever 162 is moved rearwardly and a stud 172 secured thereto engages the upwardly extending arm of a bell crank 174, swinging the latter clockwise, and through the engagement of the downwardly extending arm of the lever 174 with a stud 176 on a latching lever 178, moving the latter counterclockwise about its pivot 180, and disengaging its latching tooth 182 from the notch 184 in a bell crank 186. The latter is pivoted on a stud 188 and is biased for counterclockwise movement by the tension spring 86 so that the tooth 192 thereon may engage the notch 194 on the lower end of the pusher pawl 80 to latch the latter in the position shown in FIG. 12, during the early part of the return stroke of the machine. In this way the push pawl 80 has its toothed portion held in a position raised somewhat from the normal position, so that upon rocking of the carriage frame about the shaft 78 the push pawl 80 will engage the ratchet wheel 88 one tooth in advance (counterclockwise) of the tooth which is normally engaged by the push pawl when it is limited by stud 84, thus conditioning the machine for the next adding, subtracting, or subtotaling cycle.

Figures 10, 11:
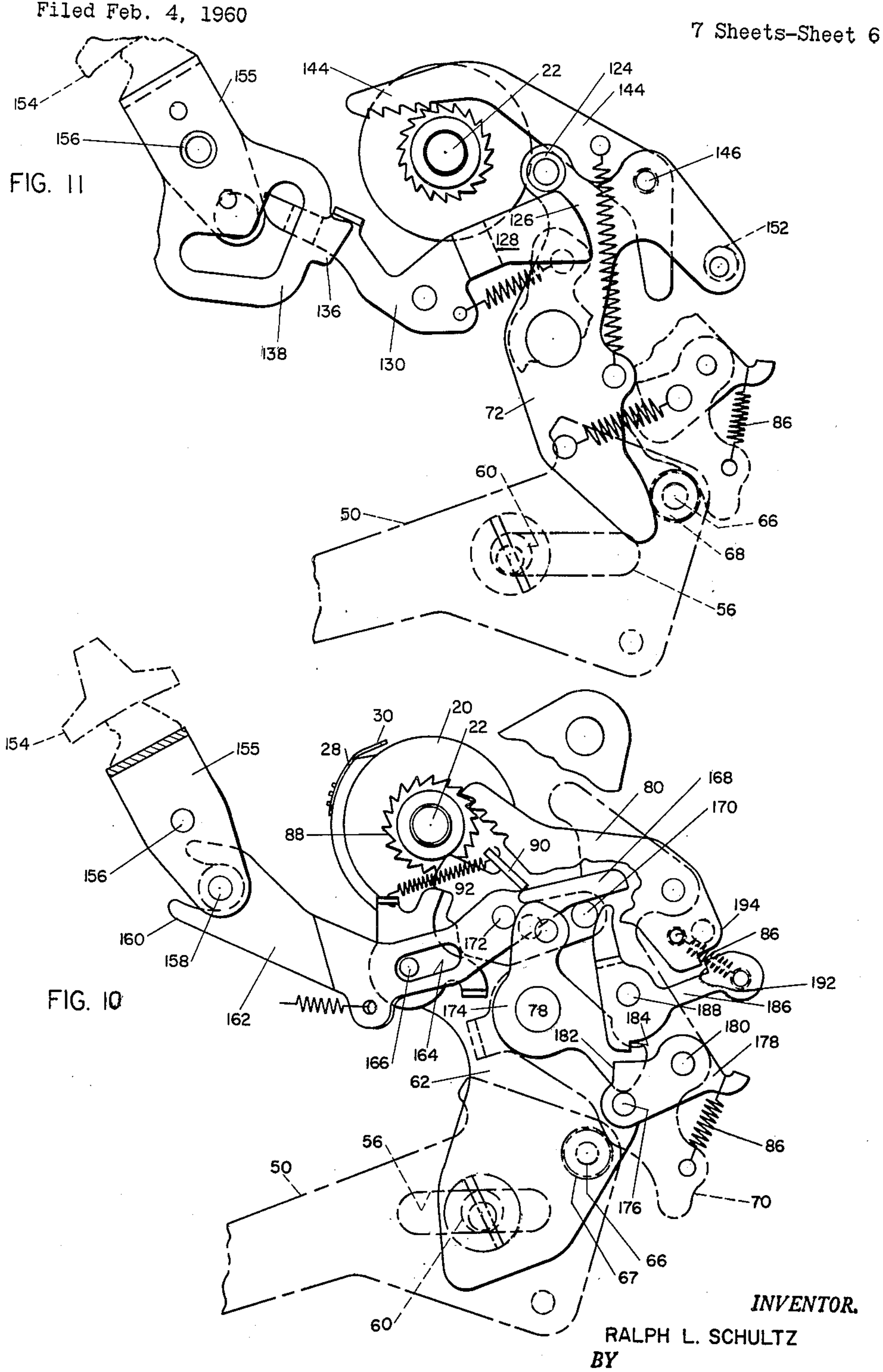
FIG. 10 is a view similar to FIG. 1, showing the pusher pawl at the beginning of its forward stroke during a total-taking operation.
FIG. 11 is a view similar to FIG. 1, showing the parts in the position they assume at the end of a forward stroke during a total-taking operation, the puller pawl being in engagement with the ratchet to cause pulling or advancement of the tape a distance of seven spaces.

Upon the return stroke the link 50 is moved forwardly (to the left, FIG. 1) swinging the paper carriage frame structure clockwise as the end of the slot 56 in the link 50 engages the stud 58, and thereafter swinging the pull pawl crank 72 clockwise to move the pull pawl 144 rearwardly. However when, as shown in FIG. 11, the total key 154 is pulled counterclockwise, a second stem portion 138 thereof, through its projection 136, swings lever 130 clockwise, thus lowering the rearwardly extending portion 128 of this lever and permitting the roller 124 on the upper arm of crank 72 to swing forwardly to the position shown in FIG. 11. The pull pawl 144 is thus permitted to advance a distance corresponding to an additional line space on the record tape, and as a result, during the return stroke, when the crank 72 is swung clockwise, the pull pawl 144 will advance the tape a distance corresponding to seven line spaces.

When counterclockwise swinging movement of the crank 72 is not limited by engagement with the end 126 of arm 128 of lever 130, the downwardly extending arm of the lever 72 engages the roller 68 to limit the extent of forward swinging movement of the pull pawl 144.

On the cycle immediately following a total-taking cycle, it is necessary to restore the pawl latching mechanisms to normal add cycle positions. This restoration of the pawl unlatching means occurs during each cycle, but is of significance only with respect to the first machine cycle after a total-taking cycle. This is effected in the following manner.

When the total key is returned to normal position (see FIG. 5) the lever 162 is swung clockwise as the paper carriage is swung counterclockwise for making the printing impression. This motion of the lever 162 is pivotal about the stud 150 so that the rearwardly extending arm of the lever 162 engages stud 170, swinging the bell crank 92 clockwise, and at the same time engaging the upwardly extending arm of bell crank 186, camming the latter clockwise to disengage the tooth 192 of the latching bell crank 186 from the notch 194 on the tail portion of the push pawl 80. This permits the tooth 182 of the latching member 178 to engage in the notch 184 of the bell crank latching member 186 by virtue of the tension spring 86. The latching parts of the mechanism are thus restored to normal latched position, and the machine is in condition for starting the subsequent cycle, in the manner diagrammed in FIG. 13, to imprint a record tape upon successive cycles as illustrated, for example, in FIG. 14.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. In a paper feed mechanism for a calculating machine or the like, the combination of a platen shaft carrying a platen thereon, a push ratchet wheel and a pull ratchet wheel secured to the platen shaft, multi-tooth push and pull pawls cooperating respectively with the ratchet wheels, a main shaft rockable through forward and return strokes, means mechanically coupling the main shaft to the pawls, said mechanical coupling means operating through the push pawl and the push ratchet to rotate the platen through a predetermined angle corresponding to several printing line spaces of a record tape upon the forward stroke of the main shaft, means including the pull pawl and pull ratchet wheel to rotate the platen in the opposite direction through an angle equivalent to at least one line space farther than the platen is rotated by the push pawl during the return stroke of the main shaft, a total-taking key, and means including the key, the pull pawl and pull ratchet wheel to rotate the platen in said opposite direction through an angle equivalent to several line spaces farther than the platen is rotated by the push pawl, thereby to provide a substantial blank space along the length of the record tape following the taking of a total.

2. In a calculating machine having a rotatably mounted platen, a main shaft having a forward and return stroke cycle and a total taking key, a record tape feed mechanism comprising a first means including a push pawl and ratchet operated by the shaft during its forward stroke to normally rotate the platen four printing line spaces in a retracting direction, a second means including a pull pawl and ratchet operated by the shaft during its return stroke to normally rotate the platen five printing line spaces in an advancing direction, and key operated means conditioning the second means for rotation of the platen seven printing line spaces and conditioning the first means for rotation of the platen three printing line spaces during a forward stroke of the main shaft following movement of the platen seven printing line spaces by the second means, thereby to provide three blank printing line spaces along the length of the record tape following the taking of a total.

3. In a calculating machine having a rotatably mounted platen, a main shaft having a forward and return stroke cycle and a total taking key, a record tape feed mechanism comprising a first means including a push pawl and ratchet operated by the shaft during its forward stroke to normally rotate the platen in a retracting direction through a predetermined angle corresponding to several printing line spaces, a second means including a pull pawl and ratchet operated by the shaft during its return stroke to normally rotate the platen in an advancing direction one printing line space farther than it is normally rotated by the first means, and key operated means conditioning the second means for rotation of the platen two printing line spaces farther than it is normally rotated by the second means and conditioning the first means for rotation of the platen one printing line space less than it is normally rotated by the first means during each forward stroke of the main shaft following movement of the platen by the key conditioned second means, thereby to provide three blank printing line spaces along the length of the record tape following the taking of a total.

4. In a calculating machine having a rotatably mounted platen, a main shaft having a forward and return stroke cycle and a total taking key, a record tape feed mechanism comprising a first means including a push pawl and ratchet operated by the shaft during its forward stroke to normally rotate the platen in a retracting direction through an angle corresponding to predetermined number of printing line spaces, a second means including a pull pawl and ratchet operated by the shaft during its return stroke to normally rotate the platen in an advancing direction at least one space farther than it is rotated by the first means, and key operated means conditioning the second means for greater than normal rotation of the platen in the advancing direction and conditioning the first means for smaller than normal rotation of the platen in the retracting direction during a forward stroke of the main shaft following the greater than normal movement of the platen by the key conditioned second means, thereby to provide a substantial blank space along the length of the record tape following the taking of a total.

5. In a calculating machine having a rotatably mounted platen, a main shaft having a forward and return stroke cycle and a total taking key, a record tape feed mechanism comprising a push pawl normally biased to a first position, key controlled means rendered effective near the end of a forward stroke when the key is actuated to bias the push pawl in a second position, means including the push pawl and a cooperating push ratchet wheel operated by the main shaft during the forward stroke to rotate the platen in a retracting direction four printing line spaces when the pawl is in the first position and three printing line spaces when the pawl is in the second position, a pull pawl, key controlled means normally biasing the pull pawl to a first position during the forward stroke and biasing the pull pawl to a second position during a forward stroke when the key is actuated, and means including the pull pawl and a cooperating pull ratchet wheel operated by the main shaft during each return stroke to rotate the platen in an advancing direction five printing line spaces when the pull pawl is in its first position and seven printing line spaces when the pull pawl is in its second position, thereby to provide three blank printing line spaces along the length of the record tape following the impression of a total.

6. In a calculating machine having a rotatably mounted platen, a main shaft having a forward and return stroke cycle and a total taking key, a record tape feed mechanism comprising a push pawl normally biased to a first position, key controlled means rendered effective near the end of a forward stroke when the key is actuated to bias the push pawl in a second position, means including the push pawl and a cooperating push ratchet wheel operated by the main shaft during the forward stroke to rotate the platen in a retracting direction a first number of printing line spaces when the pawl is in the first position and one less printing line space when the pawl is in the second position, a pull pawl, key controlled means normally biasing the pull pawl to a first position during the forward stroke and biasing the pull pawl to a second position during a forward stroke when the key is actuated, and means including the pull pawl and a cooperating pull ratchet wheel operated by the main shaft during each return stroke to rotate the platen in an advancing direction one more than the first number of printing line spaces when the pull pawl is in its first position and three more than the first number of printing line spaces when the pull pawl is in its second position, thereby to provide three blank printing line spaces along the length of the record tape following the impression of a total.

7. In a calculating machine having a rotatably mounted platen, a main shaft having a forward and return stroke cycle and a total taking key, a record tape feed mechanism comprising a push pawl normally biased to a first position, key controlled means rendered effective no sooner than near the end of a forward stroke when the key is actuated to bias the push pawl in a second position, means including the push pawl and a cooperating push ratchet wheel operated by the main shaft during the forward stroke to rotate the platen in a retracting direction a first number of printing line spaces when the pawl is in the first position and less than the first number of printing line spaces when the pawl is in the second position, a pull pawl, key controlled means normally biasing the pull pawl to a first position during the forward stroke and biasing the pull pawl to a second position during a forward stroke when the key is actuated, and means including the pull pawl and a cooperating pull ratchet wheel operated by the main shaft during each return stroke to normally rotate the platen in an advancing direction a second number of printing line spaces greater than the first number when the pull pawl is in its first position and more than the second number of printing line spaces when the pull pawl is in its second position, thereby to provide a substantial blank space along the length of the record tape following the impression of a total.

8. In a calculating machine having a rotatably mounted platen, a main shaft having a forward and return stroke cycle and a total taking key, a record tape feed mechanism comprising a push pawl normally biased to a first position and having a second position, means including the push pawl and a cooperating push ratchet wheel operated by the main shaft during the forward stroke to rotate the platen in a retracting direction four printing line spaces when the pawl is in the first position and three printing line spaces when the pawl is in the second position, a stop pivoting the push pawl from engagement with the push ratchet after selective movement of the latter, linkage including a latch conditioned by the key in its total taking position for latching the push pawl in the second position incident to its being pivoted by the stop, a pull pawl, a stop movable by the key to normal or total taking positions, linkage interconnecting the shaft and the pull pawl for movement of the pull pawl during the forward stroke to first and second positions in engagement with the stop when the stop is respectively in its normal and total taking positions, and means including the pull pawl and a cooperating pull ratchet wheel operated by the main shaft during each return stroke to rotate the platen in an advancing direction five printing line spaces when the pull pawl is in its first position and seven printing line spaces when the pull pawl is in its second position, thereby to provide three blank printing line spaces along the length of the record tape following the impression of a total.

9. The combination set forth in claim 8 together with a tear bar positioned one printing line space below the position assumed by each entry at the end of a cycle of operation other than a total taking operation, whereby the total designation will appear two printing line spaces above the tear bar at the end of a total taking cycle.

References Cited in the file of this patent

UNITED STATES PATENTS

| | | |
|---|---|---|
| 1,856,056 | Sundstrand | Apr. 26, 1932 |
| 2,064,203 | Garbell | Dec. 15, 1936 |
| 2,154,381 | Gruver | Apr. 11, 1939 |
| 2,318,000 | Lippert | May 4, 1943 |
| 2,341,630 | Lambert | Feb. 15, 1944 |
| 2,682,994 | Boyden | July 6, 1954 |